US009258307B2

(12) United States Patent
Pianese et al.

(10) Patent No.: US 9,258,307 B2
(45) Date of Patent: Feb. 9, 2016

(54) DECENTRALIZED ELECTRONIC TRANSFER SYSTEM

(71) Applicant: Alcatel Lucent, Boulogne Billancourt (FR)

(72) Inventors: Fabio Pianese, Brussels (BE); Noah Evans, Antwerp (BE)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/378,139

(22) PCT Filed: Feb. 25, 2013

(86) PCT No.: PCT/EP2013/053649
§ 371 (c)(1),
(2) Date: Aug. 12, 2014

(87) PCT Pub. No.: WO2013/127713
PCT Pub. Date: Sep. 6, 2013

(65) Prior Publication Data
US 2015/0033301 A1    Jan. 29, 2015

(30) Foreign Application Priority Data

Mar. 2, 2012 (EP) ..................................... 12305254

(51) Int. Cl.
*H04L 29/06* (2006.01)
*G06Q 20/06* (2012.01)
(Continued)

(52) U.S. Cl.
CPC ............ *H04L 63/10* (2013.01); *G06Q 20/0655* (2013.01); *G06Q 20/3672* (2013.01); *H04L 63/083* (2013.01); *H04L 67/1097* (2013.01)

(58) Field of Classification Search
CPC .............. G06Q 20/102; G06Q 20/382; G06Q 20/3825; G06Q 20/10; G06Q 40/12; G06Q 40/025; G06Q 20/40; G06Q 40/02; G06Q 20/00; G06Q 20/341; G06Q 20/3552; G06Q 30/0601; G06Q 30/06; G06Q 20/0655; G06Q 20/3672; G07F 7/1008; G07F 7/082; H04L 63/10; H04L 63/083; H04L 67/1097
See application file for complete search history.

(56) References Cited

U.S. PATENT DOCUMENTS

2006/0136332 A1\* 6/2006 Ziegler ............................ 705/39
2007/0168260 A1\* 7/2007 Cunescu et al. ................ 705/26
(Continued)

FOREIGN PATENT DOCUMENTS

EP 0724238 7/1996
EP 0907154 4/1999
(Continued)

*Primary Examiner* — Carl Colin
*Assistant Examiner* — Don Zhao
(74) *Attorney, Agent, or Firm* — Patti & Malvone Law Group, LLC

(57) ABSTRACT

An exemplary technique is provided for use in a decentralized electronic transfer system. A first digital code that represents a first transaction is generated from a first user's secure repository to the first user's unsecure repository. The first digital code is sent to a secure storage memory related to the unsecure repository to be stored in an area of the memory. A processor related to the unsecure repository generates a second digital code that represents a second transaction from the unsecure repository to the second user's repository. The processor retrieves the first digital code stored in the secure storage memory and publishes the retrieved digital code to validate the first transaction. In addition, the processor publishes the second digital code to validate the second transaction.

9 Claims, 4 Drawing Sheets

(51) Int. Cl.
*G06Q 20/36* (2012.01)
*H04L 29/08* (2006.01)

(56) References Cited

U.S. PATENT DOCUMENTS

| | | | |
|---|---|---|---|
| 2007/0289000 A1* | 12/2007 | Weiss | 726/5 |
| 2008/0040274 A1* | 2/2008 | Uzo | 705/44 |
| 2009/0055319 A1* | 2/2009 | Raheman | 705/44 |
| 2009/0132413 A1* | 5/2009 | Engelbrecht | 705/40 |
| 2009/0287837 A1* | 11/2009 | Felsher | 709/229 |
| 2010/0120408 A1* | 5/2010 | Beenau et al. | 455/419 |
| 2010/0192230 A1* | 7/2010 | Steeves et al. | 726/26 |
| 2011/0119155 A1* | 5/2011 | Hammad et al. | 705/26.41 |
| 2013/0041776 A1* | 2/2013 | Schunemann | 705/26.41 |
| 2013/0080223 A1* | 3/2013 | Lavu et al. | 705/14.11 |
| 2014/0337175 A1* | 11/2014 | Katzin et al. | 705/26.62 |

FOREIGN PATENT DOCUMENTS

| | | |
|---|---|---|
| JP | 2004005037 | 1/2004 |
| JP | 2008071183 | 3/2008 |
| WO | 96/09592 | 3/1996 |
| WO | 2007/041098 | 4/2007 |

* cited by examiner

DECENTRALIZED ELECTRONIC TRANSFER SYSTEM

TECHNICAL FIELD

The present invention relates to a method and apparatus for use in a decentralized electronic transfer system.

BACKGROUND

Decentralized electronic transfer systems are created to circumvent the necessity and avoid the costs of having a central organism checking and validating each transfer. Central electronic transfer systems rely on the combination of identification and authentication to the central organism of a user to validate a transfer request made by the user. Decentralized electronic transfer systems rely on the combination of identification and publication to validate a transfer request. Thereby the public will be able to see all transfers, they are published, and check the correctness of thereof. This form of social control, combined with mechanisms to reject incorrect published transfers, form the backbone of the decentralized electronic transfer system.

A drawback of the decentralized electronic transfer system is the risk of losing an unsecure repository, and consequently losing all transfers made to this unsecure repository. Solutions have been provided in securing repositories thereby keeping them safe from theft and loss. This however is a drawback for the usability of decentralized electronic transfer systems as the bar to use the secure repository is significantly raised.

It is an object of the present invention to provide a method and apparatus for use in a decentralized electronic transfer system that solves at least one of the above-mentioned drawbacks.

SUMMARY

An embodiment of the present invention provides a method for use In a decentralized electronic transfer system, the method comprising the steps of:
  Generating a first digital code representing a first transaction from a first user's secure repository to the first user's unsecure repository;
  Sending the digital code to a secure storage memory related to the unsecure repository to be stored in an area of the memory;
  Generating by a processor related to the unsecure repository a second digital code representing a second transaction from the unsecure repository to the second user's repository;
  Connecting the processor to the internet;
And the subsequent steps of:
  Retrieving by the processor the first digital code stored in the secure storage memory;
  Publishing by the processor via the Internet connection of the retrieved digital code to validate the first transaction;
  Publishing by the processor via the Internet connection of the second digital code to validate the second transaction.

According to this embodiment of the invention, a new repository state is created. Conventionally, there are two states of a repository, being an empty state and a filled state These states are according to the embodiment of the invention complemented by a new state being a potential-to-be-filled state. Thereby the unsecure repository is empty {or nearly empty) but comprises information with which it can {thereby having the potential to) re-fill itself. To achieve this, a separation is made between the creation of the transfer code and the publication thereof. In a conventional configuration, a transfer code is published directly after being generated, to make the transfer effective. According to the invention, the first transfer code, with the purpose of refilling the unsecure repository, is in first instance not published but stored in a secure storage memory area of the unsecure repository. The repository is provided to publish the first transfer code, thereby making it effective, before publishing the transfer code relating to the outgoing transfer. Thereby, re-filling and emptying of the repository by respective publications of transfer codes can be performed in a small timeframe. Thereby the risks of losing a filled repository is minimized, namely the timeframe wherein the repository is filled (after publication of the first transfer codes and before publication of the second transfer codes) is small.

Preferably, the first digital code comprises a plurality of digital codes each representing a transaction of a predetermined value, wherein the processor retrieves a selection of the plurality of digital codes in such a manner that the value of the selection is equal or higher than a second transaction's value.

The plurality of digital codes gives freedom to the user as to when a second transaction is to be made. A combination of the digital codes can be made so that the cumulative represented value is exactly or at least close to the desired value. This reduces risk at the moment of loss of the unsecure repository because excess of value in the unsecure repository is avoided.

Preferably, a third digital code is generated by the processor related to the unsecure repository representing a third transaction from the unsecure repository to the secure repository, the third transaction representing a value in such a manner that the value of the selection is equal to the sum of the second transaction's value and the third transaction/s value, the third digital code being published after the publication of the retrieved digital code, by the processor via the Internet connection to validate the third transaction.

By generating and publishing a third transaction/values can be balanced so that the repository is empty again after publishing of the transaction codes. This reduces the effective loss to zero when the unsecure repository becomes inaccessible due to theft or loss.

Preferably/the step of retrieving the first digital code is preceded by the step of entering a pin-code to gain access to the secure storage memory.

The pin-code provides a barrier for an unauthorized person to access the unsecure repository. Particularly because the memory related to the unsecure repository comprises transfer codes by which the repository can be filled such barrier is advantageous. The secure memory area prevents direct reading access to the memory contents and only allows reading access to the memory whereby a predetermined processor has successfully completed authentication. Thereby the processor has access and performs the necessary steps with the data from the memory. Restricting the access to the processor via a pin-code provides a further risk-decreasing effect. It will be clear that other authentication procedures can be used that are technically equivalent to the proposed pin-code procedure.

Preferably, the step of generating the second digital code is preceded by the step of entering a second pin-code to gain access to the codes generating function in the processor. Generating a digital code and retrieving first digital code from a memory are different functions for which different authorization requirements can be set up. The pin-codes can have the same numerical number or can be different. The second pin-code provides a barrier preventing an unauthorized person from instructing the processor to operate the repository. Preferably, the processor generates digital codes based on a first public address representing the unsecure repository, a second public address representing the second user's repository, a value and a private signature related to the unsecure repository.

When the processor, which is part of the secure storage memory, is programmed to generate the digital codes, the public address can be stored in the secure memory. Should the repository come into the possession of an unauthorized person, this person cannot retrieve the address of the repository, and can consequently not generate a transfer code. Only an authorized user, in possession of the PIN-code for activating the processor, can generate and publish transfer codes.

Preferably, the steps of publishing the first and second digital codes are executed in a predetermined timeframe. Preferably, the predetermined timeframe is smaller than 5 minutes, preferably smaller than 1 minute, more preferably smaller than 30 seconds. It is the time in between the publishing of the first digital code and the second digital code that the repository is in a filled state. Therefore, to minimize chances of loss of a filled repository, the time that it is in the filled state should be minimized.

Preferably, the steps of publishing the first and second digital codes are executed via an atomic operation. In an atomic operation, one action cannot be separated from the other action. Although two steps, they are executed as one. Thereby, a filled repository cannot be lost, as it s filled and emptied in one go.

In another embodiment, the invention relates to a repository for use in a decentralized electronic system, the repository being connected to communication means for receiving a first digital code from a secure repository, to a secure storage memory adapted to store the first digital code, to a processor adapted to access the secure storage memory, and programmed to generate a second digital code representing a second transaction, and to input means for instructing the processor to generate the second digital code, the processor being programmed to subsequently publish via the communication means the first digital code and the second digital code.

The repository according to an embodiment of the invention is connected to those elements necessary to implement the method according to the invention. It combines a unique combination of features allowing to make transfers from the repository while reducing the risk of losing transfers made to the repository upon loss of the latter. This is achieved by providing a secure storage memory wherein a first code can be stored. This first code can be published when a user intends to make a second transaction, whereby the publication of the first transaction has as an effect that the repository is 'filled' and thereby in a state where it can transfer to a third party.

BRIEF DESCRIPTION OF THE FIGURES

Some embodiments of apparatus and/or methods in accordance with embodiments of the present invention are now described by way of example only and with reference to the accompanying drawings in which.

DETAILED DESCRIPTION OF EMBODIMENTS

Figure 1A:
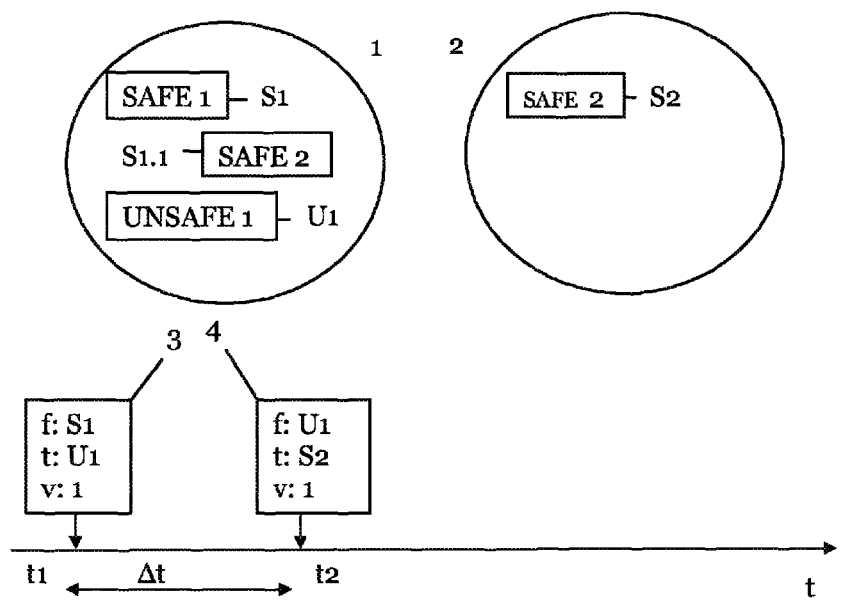
FIG. 1 illustrates the working principles of the invention.

Electronic payment systems are an established feature of modern banking industry. Traceable electronic payment instruments such as credit and debit cards are today widely common among the general population. On the other hand/ untraceable payment schemes have been studied in the literature for the last 30 years, since the seminal papers by David Chaum presented ecash, an untraceable payment medium based on blind signatures and a 'bank' (trusted party) who generates the currency/redeems it/and check all transactions against fraud by either users or merchants.

Decentralized untraceable electronic payment systems appeared more recently to remove the necessity of a centralized trusted party that checks and validates each currency transaction. The advantages of decentralized systems include: lack of a central entity that controls the operation of the whole system which could become a single point of failure; lack of implied trust in a single economic entity to create/ redeem, and guarantee the value of an electronic currency; absence of processing delays due to legal or organizational concerns, such as week-ends or bank holidays removal of the processing burden on a central entity that establishes arbitrary transaction fees as a form of compensation.

Centralized electronic currency systems usually require a trusted party that validates a transaction between customer and merchant, upon presentation by the merchant of a proof of payment by the customer. Decentralized electronic currency systems rely on the public visibility and ability to verify the history of past transactions to validate a payment request. The correctness of the entire history of payments is guaranteed by public scrutiny, which enforces measures to prevent incorrect transfers from being included in the historical record of system activity. In such a system, anonymity (or pseudonimity) is achieved by having users autonomously create expendable identities, supported by asymmetric cryptography, that allow users to emit new payments or claim outstanding data transfers via the use of a public-private key pair. An example of decentralized electronic currency system in the literature is BitCoin, published in recent years and increasingly adopted by the public.

A major issue with decentralized electronic currency systems lies In the underlying key management subsystem that enables users to emit and claim currency transfers. A first challenge is the risk of losing control (by theft, unauthorized duplication, or destruction) of an electronic device holding a public-private key, which implies losing all funds associated to this electronic device. Conventional solutions have been devised for securing electronic devices in fixed-access scenarios (workstations, laptops) based on disk file encryption and decryption combined with remote backup, thereby protecting such electronic devices from theft and loss as long as backup copies are preserved and the encryption passphrase is not forgotten. These solutions however have drawbacks for the usability of decentralized electronic currency systems as they significantly compromise the user experience.

A serious usability issue is incurred by static backups of an electronic device holding a key: since new keys are continuously generated as part of the operation of the system (e.g. in order to preserve user pseudonimity), backups need to be constantly refreshed to comprise the new keys used in operations in which currency is received.

In these circumstances, the loss of control by the user of an electronic device holding a key would only allow a partial recovery of the user's possessions {i.e. just the funds associated with the keys that are contained in the backup) This issue is especially critical for portable and mobile hardware, such as laptops, smartphones, and other devices with intermittent {and costly, and possibly unreliable or insecure) connectivity to a network that could allow the frequent update of the backup copy of the electronic device holding the key.

The present invention provides in an embodiment a method and apparatus for use in a decentralized electronic currency system that solves the usability issue with the above solution to key management, while also providing a generic mechanism for reducing the risk of loss of funds, i.e. any amount of currency the user may have accumulated as a result of past transactions. The method is based on the use of two electronic devices, a first 'safe' one, which is to be stored carefully and possibly regularly backed up, and a second 'unsafe' one, which is suitable to be installed on portable devices and used for payments in mobility context.

Bitcoin is a decentralized electronic currency system using peer-to-peer networking, digital signatures and cryptographic proof-of-work to enable irreversible transfers (payments) between parties without relying on trust. Payments are made in bitcoins, a digital currency issued and transferred by the Bitcoin network. Nodes broadcast transactions to the network, which records them in a public history after validating them through a consensus-based proof-of-work system. The present invention is not limited to Bitcoin, and is applicable in other decentralized electronic systems where transfers are made.

For a correct understanding of the invention, hereafter some terms are defined. A repository is a physical or digital holder of funds. A digital holder of funds is an object or address to which funds are assigned or linked. In Bitcoin, funds are assigned to public-private keys. Therefore in the description of the present invention, each public-private key is a repository since funds can be assigned to such key.

A digital repository (as it is an address or a key) can be stored in a memory. Multiple repositories can be stored in one memory of an electronic device. Theft or loss of this electronic device results in a loss of the repositories and all funds stored therein or assigned thereto.

Users of decentralized electronic systems each have multiple repositories. In a repository, the user can store a budget, preferably in a digital currency. This budget contains funds having a value. The repository functions as a digital wallet. As a consequence, repositories are usually protected well, and kept in a safe place. However keeping the repository safe prevents the repository from being easily used by the owner thereof. Therefore conventionally/as a safety measure, users can keep the safe repositories (eg vaults) for storage of funds and the unsafe repositories (eg wallets). In safe repositories, a budget with high value can be stored whereas in unsafe repositories the value of the budget contained should be kept rather small. If an unsafe repository runs low in value, it is replenished by the user using the safe repository.

To make a transfer from one repository to another repository, whether both repositories are owned by the same or different persons is irrelevant, a digital code is generated. The digital code is based on the identity of the sender (the digital address of the sending repository), the identity of the receiver (the digital address of the receiving repository) and the amount to be transferred. Preferably this digital code is furthermore signed using a private encryption key related to the sender. The digital code makes clear what (amount) is to be transferred from who (sender) to whom (receiver). The signature can be verified by anyone by way of the sender's public key.

The transfer in a decentralized electronic system only takes effect after publication. In fact the transfer becomes effective after validation by the public, meaning that after publication the public has the power to invalidate a published transfer if it considers the transfer not valid (for example because the repository did not contain the transferred amount of funds or because the sender's signature is erroneous) The decentralized electronic system has validation mechanisms by which the public can accept or reject published transfers.

Validated digital codes representing transfers are bundled and linked in a chain. For newly published digital codes, it is calculated whether they are coherent with the existing chain, and if positive, the digital code is made part of the chain/ thereby becoming validated. If there is an incoherence between the existing chain and the digital coder the digital code is rejected thereby invalidating the transfer represented by the digital code.

In decentralized electronic systems it is all about codes (repository addresses and encryption codes). A user can, based on the codes of a repository, make a transfer from that repository to any other repository. Therefore in a conventional decentralized electronic system the safety of the codes are enhanced by vaults, encrypted storage or other means.

The method of an embodiment of the invention provides in a new state of a repository, which enhances the safety of the budgets available in the repository in a different way. Instead of filling an unsafe repository (as is conventionally done), the unsafe repository is provided with information with which it can refill itself. Thereby the repository is not in a filled state since no transfers have been made to the repository. The repository is also not in an empty state because it contains the information to be filled. The repository is, as explained above, in a potential-to-be-filled state. Transfer codes are generated (transferring a value from a user's safe repository to the unsafe repository) and stored in the unsafe repository.

When such repository would be lost or stolen, the rightful owner, who is also owner of the safe repository used to replenish the unsafe repository, can empty the safe repository by transferring the budget of this safe repository to a third repository. When the stolen unsafe repository would be used, meaning the codes stored would be published, these publications will be rejected by the public because the safe repository {from which the value to replenish the unsafe repository would come) is empty.

The upper part of FIG. 1 shows some repositories owned by two users, user 1 and user 2, in a decentralized electronic system. User 1 has three repositories being safe 1 with the address as 1, safe 1.1 with address as 1.1, and unsafe 1 with address U1. Thereby safe 1 and safe 1.1 are stored safely for example in a vault whereas unsafe 1 is used by user 1 as a wallet, and 1S therefore not securely stored. User 2 has one repository being safe 2 with the address as 2.

As an example, let's assume that all safes are empty except for safe 1, which contains a value 1. In the conventional system, shown by FIG. 1A, user 1 generates a digital code thereby transferring his value 1 from safe 1 to unsafe 1. This is shown in the figure in block 3, where the digital code is represented by the data it is based upon: f (from) is S1, t (to) is U1 and v (value) is 1. This digital code is, in a conventional system, published, at a certain time, so that it can be validated by the public. When the user 1 intends to make a payment to user 2 using his wallet (unsafe 1) the user generates a new digital code, represented by block 4. Block 4 shows that the digital code represents a transfer of value (v) 1 to safe 2 (S2)

and from unsafe 1 (U1). It is published at the time T2 after which it can be validated by the public.

The unsafe repository U1 contains the value 1 over a time period t. If In this time period the unsafe repository is lost or stolen, the value 1 is lost.

Figure 1B:
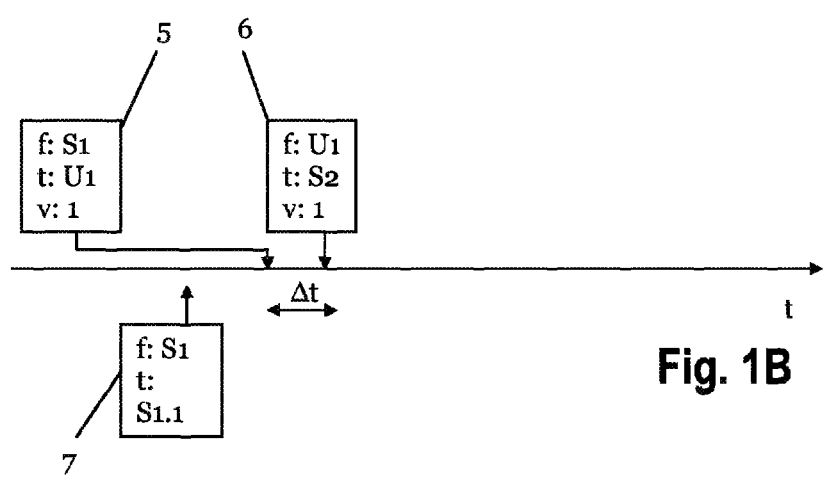

FIG. 1B shows a similar situation, however using the method of an embodiment of the invention. It shows in block 5 how a first digital code is generated transferring a value 1 from safe 1 (S1) to unsafe 1 (S2) similarly to block 3. However instead of publishing this digital code, it is stored in the unsafe repository. When a user wants to make a transfer to another user, he generates a second code, represented by block 6, similar to block 4, but before he publishes this second digital code, he first published the first digital code generated in block 5. Thereby the user replenishes the repository shortly before he spends the value in the repository. This makes the time that the repository is filled very short.

Should the unsafe repository be lost or stolen in the case of FIG. 1B, then a transfer as illustrated by block 7 would prevent a malicious user to use the information stored in the unsafe repository. Namely block 7 represents a digital code of a transfer from safe 1 (81) to safe 1.1 (81.1) with value 1. Publishing this block will empty safe 1 in favor of safe 1.1. The malicious user publishing the code that is in the unsafe repository, would publish a transfer from an empty repository to another repository. Transfer from empty repositories cannot be validated, the public will reject the transfer code as it recognizes that safe 1 does not contain the value 1 anymore.

Figure 2:
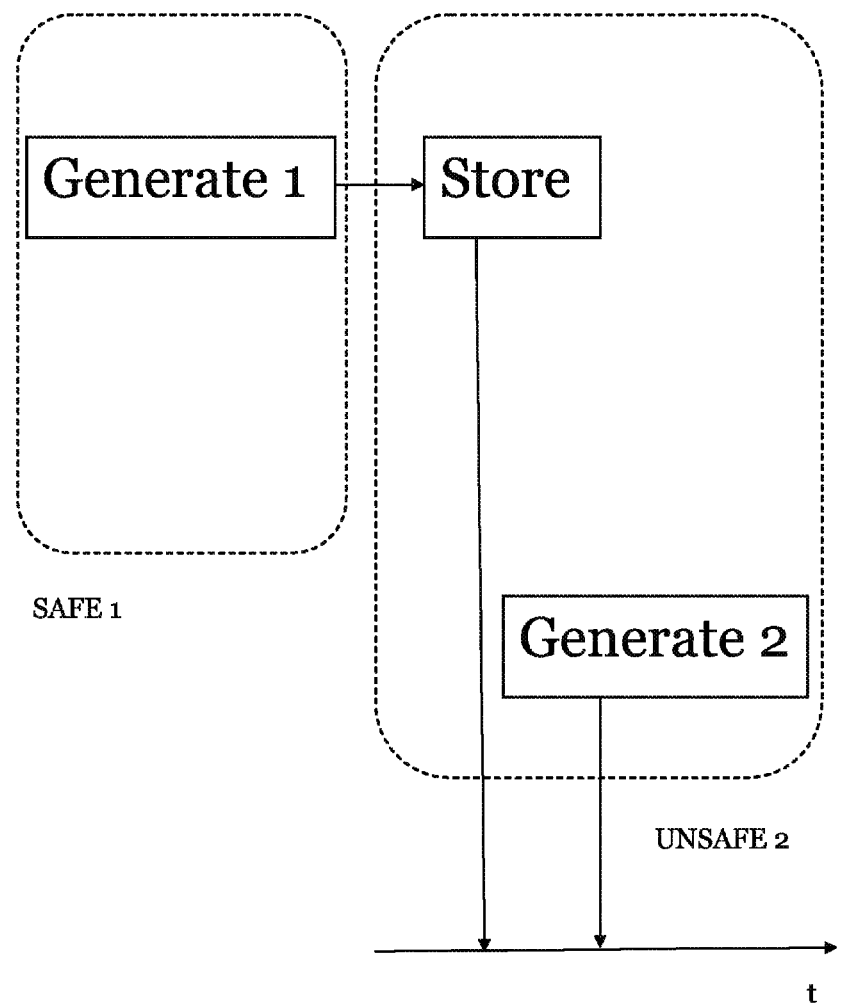
FIG. 2 illustrates the different repositories used in the method of the invention.

FIG. 2 shows the method according to an embodiment of the invention in a different way. It shows how safe 1 generates a code (Generate 1), and sends this code to unsafe 1, where it is stored. Unsafe 1 can generate a second code (Generate 2) and can publish the stored code before the generated code. The publication of the codes in the figures represented by an arrow touching the timeline T.

Figure 3:
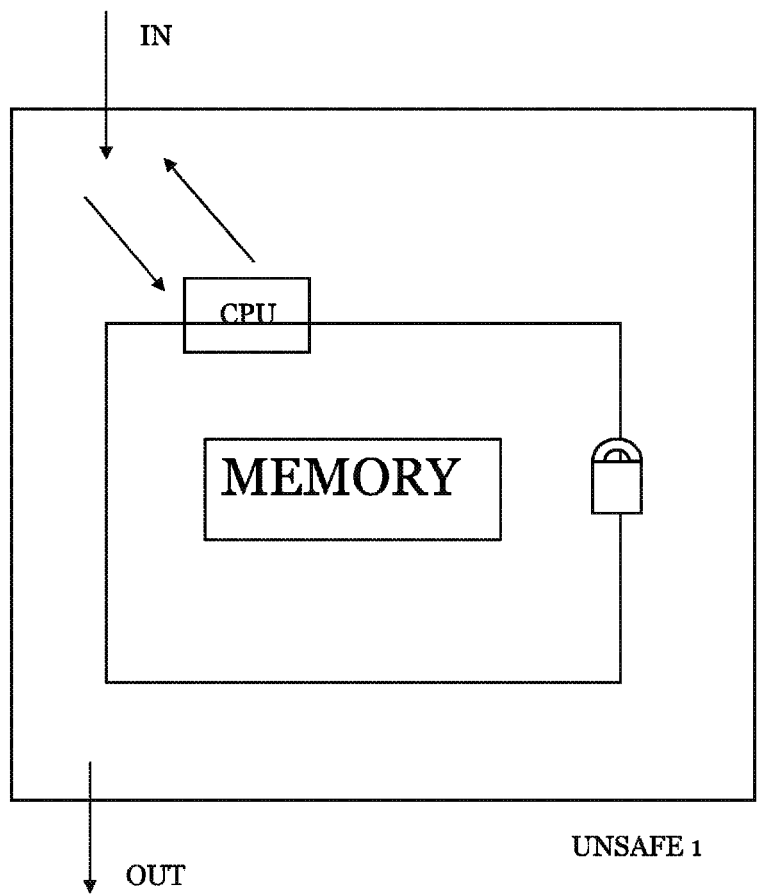
FIG. 3 illustrates a repository according to the invention.

FIG. 3 shows the architecture of an electronic device that can be used to store unsafe repository 1 according to a preferred embodiment whereby the blocks shown in the figure are functional blocks. FIG. 3 shows how unsafe 1 contains a secure storage memory (memory) which is only accessible via a predetermined processor (CPU). The digital codes generated to replenish unsafe 1, are stored in the secure storage memory. This enhances the safety of the digital codes stored in unsafe 1, as the memory is not directly accessible, but only accessible via the CPU, which can be protected by password. Unsafe 1 comprises an entry (IN) for receiving requests for the user for generating transfer codes, and for receiving digital codes generated to replenish unsafe 1, which can be stored in the memory. Unsafe 1 also comprises an exit (OUT) via which it can output generated codes or digital codes stored in the memory, as requested by a user. The entrance and the exit are provided by electrical (or other types of physical) connection ports on the electronic device. Preferably the entrance and the exit are formed by one or several internet connection ports. In such electronic device, the private-public keys which form the repository can be stored in an area of the secure storage memory which also holds the digital codes. Alternatively, they can be stored in a separate secure memory.

A secure storage memory is known in the art and comprises a processor and a memory that is exclusively accessible via the processor. Thereby, the processor regulates and controls the access to the data stored in the memory. Such secure storage memory prevents the access to the data by unauthorized users.

The method of the invention can be further optimized by generating multiple digital codes for replenishing the unsafe 1. Thereby the multiple digital codes have as a purpose that the replenishing value can be chosen by choosing which digital codes are published. This allows a user to replenish the unsecure repository with the exact amount, or the amount laying close to the amount he or she wants to spend with the unsafe repository.

As a further safety measurement, a third digital code can be generated after a transfer to a third party have been made, to empty the unsafe repository. This third digital code thereby represents a transfer of an amount that is equal to the replenishing amount minus the transfer amount, being the amount that is left on the unsafe repository after the transfer to the third party has been made, to a safe repository of the first user.

The method according to an embodiment of the invention can be further improved by requiring transfers made of unsecure repositories to lay within a predetermined timeframe. An example of an requirement is that the publication of the digital code for replenishing the unsafe depository and the publication of the digital code for transferring a value to a third party must lay within a timeframe of maximum 10 minutes, preferably maximum 5 minutes, more preferably maximum 1 minute, most preferably maximum 30 seconds.

The method according to an embodiment of the invention can be further improved by implementing the publication of the first digital code and the publication of the second digital code as an atomic operation. More preferably, the publication of the first, second and third digital code is implemented as an atomic operation. This ensures that the unsecure repository is always empty, namely it is refilled and emptied by transfers again in one action.

Figure 4:
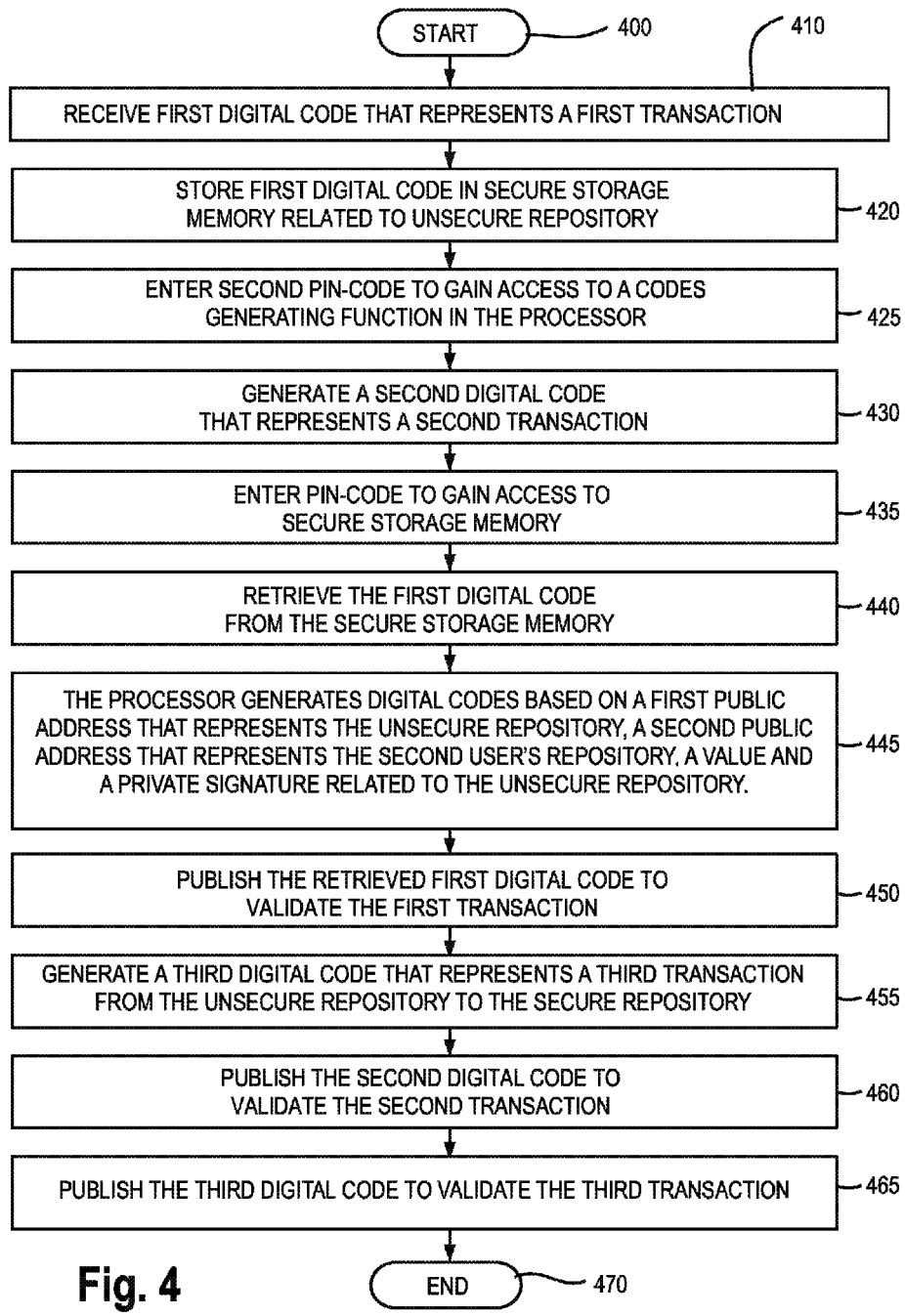
FIG. 4 shows an illustrative flow chart for an exemplary method of operating an embodiment of the invention arranged in accordance with the principles of the invention.

FIG. 4 shows an illustrative flow chart for an exemplary method of operating an embodiment of the invention arranged in accordance with the principles of the invention.

The present inventions may be embodied In other specific apparatus and/or methods. The described embodiments are to be considered in all respects as only illustrative and not restrictive. In particular, the scope of the invention is indicated by the appended claims rather than by the description and figures herein. All changes that come within the meaning and range of equivalency of the claims are to be embraced within their scope.

A person of skill in the art would readily recognize that steps of various above described methods can be performed by programmed computers. Herein, some embodiments are also intended to cover program storage devices, e.g., digital data storage media, which are machine or computer readable and encode machine executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader In understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the FIGS. 1-3, including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the FIGS. 1-3 are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The invention claimed is:

1. A method for use in a decentralized electronic transfer system, the method comprising the steps of:
   receiving, at a processor related to an unsecure repository of a first user, a first digital code that represents a first transaction from a secure repository of the first user to the unsecure repository;
   storing, by the processor, the first digital code in an area of a secure storage memory related to the unsecure repository;
   generating, by the processor, a second digital code that represents a second transaction from the unsecure repository to a second user's repository;
   retrieving, by the processor, the first digital code stored in the secure storage memory;
   publishing, by the processor via an Internet connection, the retrieved first digital code to validate the first transaction; and
   publishing, by the processor via the Internet connection, the second digital code to validate the second transaction;
   wherein the processor generates digital codes based on a first public address that represents the unsecure repository, a second public address that represents the second user's repository, a value and a private signature related to the unsecure repository.

2. The method according to claim 1, wherein the first digital code comprises a plurality of digital sub-codes each representing a transaction of a predetermined value, and wherein the processor retrieves a selection of the plurality of digital sub-codes in such a manner that the value of the selection is equal or higher than a second transaction's value.

3. The method according to claim 2, further comprising the step of generating, by the processor, a third digital code that represents a third transaction from the unsecure repository to the secure repository, the third transaction representing a value in such a manner that the value of the selection is equal to a sum of the second transaction's value and the third transaction's value.

4. The method according to claim 3, further comprising the step of publishing, by the processor via the Internet connection, the third digital code, after the publication of the retrieved first digital code, to validate the third transaction.

5. The method according to claim 1, wherein the step of retrieving, by the processor, the first digital code is preceded by the step of entering a pin-code to gain access to the secure storage memory.

6. The method according to claim 1, wherein the step of generating, by the processor, the second digital code is preceded by the step of entering a second pin-code to gain access to a codes generating function in the processor.

7. The method according to claim 1, wherein the step of publishing, by the processor via the Internet connection, the retrieved first digital code and the step of publishing, by the processor via the Internet connection, the second digital code are executed in a predetermined timeframe.

8. The method according to claim 7, wherein the predetermined timeframe is smaller than 5 minutes.

9. The method according to claim 7, wherein the step of publishing, by the processor via the Internet connection, the retrieved first digital code and the step of publishing, by the processor via the Internet connection, the second digital code are executed via an atomic operation.

* * * * *